May 30, 1961 P. A. SEAY 2,986,696
METHOD AND APPARATUS FOR ANALYZING PHASE SHIFTING NETWORKS
Filed Nov. 23, 1954 3 Sheets-Sheet 1

INVENTOR
PERRY A. SEAY
BY
Burgess, Ryan & Hicks
ATTORNEYS

May 30, 1961 P. A. SEAY 2,986,696
METHOD AND APPARATUS FOR ANALYZING PHASE SHIFTING NETWORKS
Filed Nov. 23, 1954 3 Sheets-Sheet 2

INVENTOR
PERRY A. SEAY
BY
ATTORNEYS

United States Patent Office 2,986,696
Patented May 30, 1961

2,986,696
METHOD AND APPARATUS FOR ANALYZING PHASE SHIFTING NETWORKS

Perry A. Seay, Flushing, N.Y., assignor to Reeves Instrument Corporation, New York, N.Y., a corporation of New York Filed Nov. 23, 1954, Ser. No. 470,711

19 Claims. (Cl. 324—57)

This invention relates to electrical testing and measuring systems and more specifically to an improved method and apparatus for analyzing phase shifting networks.

Phase shifting networks are employed for a variety of purposes in electronic and electro-mechanical apparatus in order to attain certain desired modes of operation. Such a device functions to advance or retard the phase of one frequency relative to another and the magnitude of such advance or retardation varies with frequency. While the design of phase shifting devices and particularly resistance-capacitance networks is well known, it is necessary in most cases to experimentally test the response of the network over the frequency range in which it is to function. This involves a relatively laborious and time consuming procedure requiring suitable wide-band test oscillators and measuring equipment. When making high frequency measurements, stray capacities are usually encountered and elaborate precaution must be taken to maintain them at a minimum in order to insure reasonably accurate results. Similarly at frequencies under 20 cycles per second the problem of generating pure sine waves and accurately measuring them presents substantial difficulties not easily overcome.

Accordingly it is one object of the invention to provide an improved method and apparatus for designing and checking the operation of phase shifting networks over a predetermined frequency band wherein the need for wide band oscillators is eliminated along with the attendant difficulties encountered at both the high and low portions of the frequency band. To this end means are provided for utilizing a single frequency and modifying certain constants of the network to produce the same phase and amplitude variations that would be experienced by changing the frequency of the input signal by an equivalent amount. This has the added advantage of enabling the measurements to be performed at a convenient frequency and thus greatly simplifying the entire procedure. Moreover, errors in calculations can be readily detected, corrected and experimentally checked, thus eliminating the laborious task of rechecking all of the computations and then experimentally verifying them again.

Another object is to provide an improved linear calibrated phase shifter for use in measuring the phase response of phase-shifting networks.

The above and other objects and advantages will become more apparent from the following description and accompanying drawings forming part of this application.

As pointed out above, this invention provides means for experimentally analyzing networks embodying combinations of resistance with capacity and inductance to determine their behaviour in terms of phase shift and amplitude over a predetermined frequency range. While normal network computations may be checked in this way, more expeditious graphical methods may be used since the results can be obtained quickly and suitable changes made to attain the desired ends. Moreover, a whole family of curves can be produced quite easily to determine whether the best choice of network consstants has been made to meet specific requirements.

More specifically, the invention utilizes the principle of varying elements of the network in lieu of varying the operating frequency and thereby eliminates the need for expensive oscillators as well as the problems entailed at the very high and very low frequencies. Changing the resistance values for instance in an R-C network by multiplying them by a constant K, has been found to produce the same phase and amplitude variations that would be obtained by changing the frequency of the input signal by the same factor.

Figure 1:
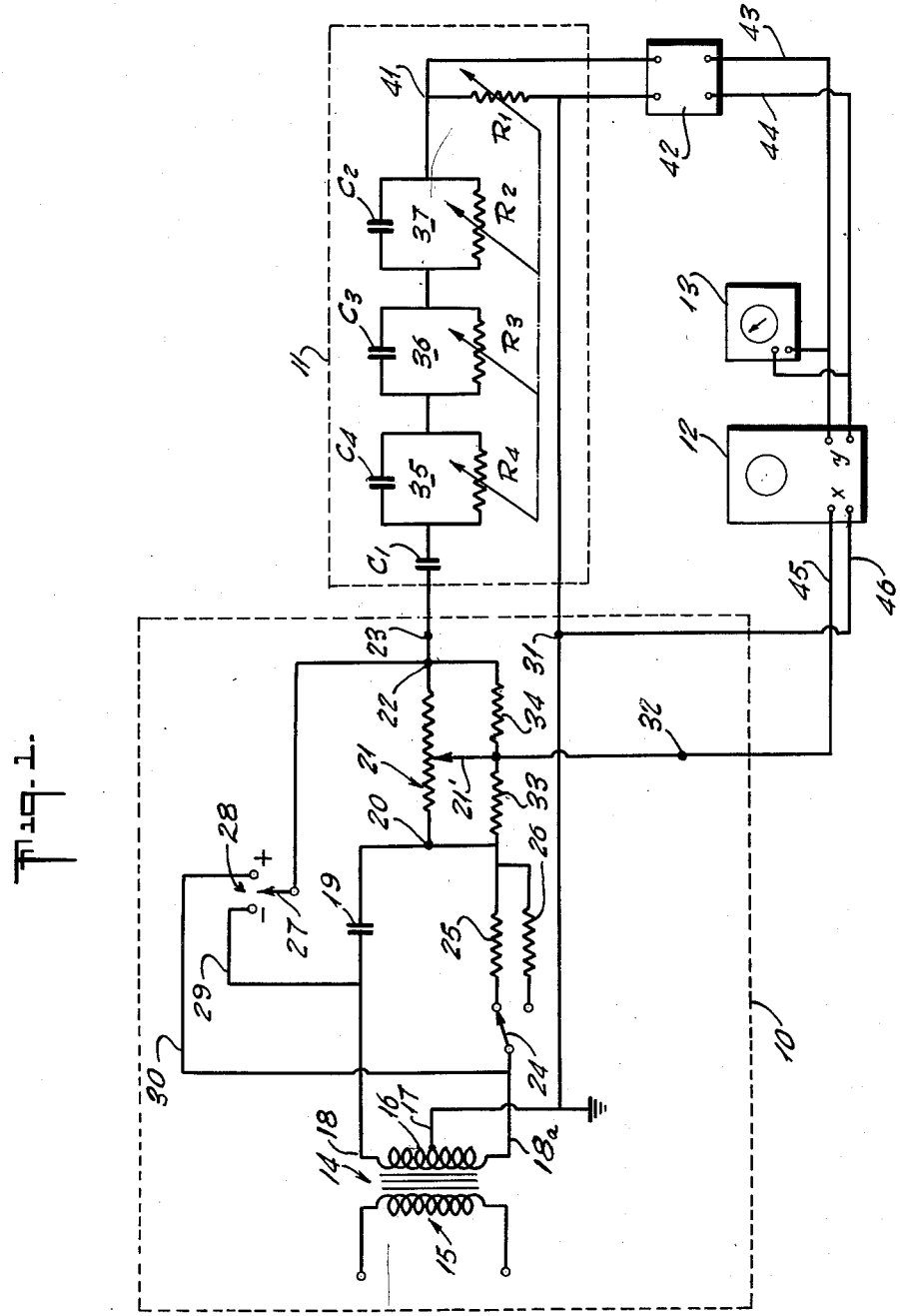
Fig. 1 is a circuit diagram of a phase shifter and an R-C phase shifting network in accordance with the invention.

Referring now to the drawings and more specifically to Fig. 1 thereof, the invention consists of a phase shifter 10 and an adjustable R-C network 11 coupled with the phase shifter and suitable testing or measuring equipment such as an oscilloscope 12 and a vacuum tube voltmeter 13 connected to both the phase shifter and the R-C network. The phase shifter 10 is preferably designed to operate at a suitable power frequency such as 60 cycles per second or 400 cycles per second and is provided with a power transformer 14 having a primary winding 15 for connection to the source of power. In this particular embodiment of the invention the secondary 16 of the transformer 14 develops 12.6 volts and is provided with a center tap 17 so that the voltage on each side of the tap is 6.3 volts. While this particular transformer has been used because it is a generally available component for heating the filaments of vacuum tubes, any other suitable transformer may be employed that will meet the requirements of a given situation.

The upper terminal 18 of the secondary 16 is connected through a condenser 19 to one end terminal 20 of a potentiometer 21. The other end terminal 22 of the potentiometer is connected to an output terminal 23 of the phase shifter. The lower terminal 18a of the transformer secondary 16 is connected to a movable contactor of a two position switch 24. In one position of the switch 24, the end terminal 18a of the transformer secondary is connected through a resistor 25 to the end terminal 20 of the potentiometer 21 and in the other position of the switch the end terminal of the transformer secondary is connected through a resistor 26 to the end terminal 20 of the potentiometer. The resistors 25 and 26 together with the condenser 19 function to shift the phase of the voltage applied to the end terminal 20 through 90 degrees at a given frequency so that the signals at the ends of the potentiometer 21 are 90° apart. Assuming that the transformer 14 is designed to operate at both 60 and 400 cycles, the resistor 25 and condenser 19 are selected to produce the desired 90 degree phase shift at 60 cycles while the resistor 26 is selected so that in combination with condenser 19 it will produce a 90 degree phase shift at 400 cycles, In each case the value of the resistance may be calculated by the formula $$R = \frac{1}{2\pi FC}$$

where F is the frequency and C is the capacity of condenser 19.

The end terminal 22 of the potentiometer 21 is connected to a movable contactor 27 of a two position switch 28 so that in one position the contactor 27 is connected through a lead 29 to the terminal 18 of the transformer winding 16 while in the other position it is connected through a lead 30 to the terminal 18a of the transformer winding 16. Thus, with the switch 28 in one position, the phase of the signal appearing at the contactor 21' of the potentiometer 21 as the contactor 21' is moved over the resistance element from one end terminal 20 to the other end terminal 22 will vary from 0 to 90° and with the switch 28 in the other position the phase of the signal appearing at the contactor 21' will vary from 0 to −90°.

The center tap terminal 17 of the transformer secondary 16 is preferably connected to ground and to an output terminal 31 of the phase shifter. The movable contactor 21' of the potentiometer is connected to a third output terminal 32 of the phase shifter and through resistors 33 and 34 to the end terminals 20 and 22, respectively, of the potentiometer 21.

The resistors 33 and 34 produce a non-linear shift in resistance between the end terminals of the potentiometer and the contactor 21' as the latter is displaced. By properly proportioning the values of the potentiometer 21 and resistors 33 and 34, as described in my application Serial No. 442,461, filed July 12, 1954, entitled "Tangent Computer Circuit," and assigned to the same assignee as the present application, and now Patent No. 2,948,474, it has been found that the phase of the voltage appearing at the contactor 21' will vary substantially uniformly from 0–90° as the contactor is moved from one potentiometer end terminal to the other. The proper values of each of the resistors 33 and 34 are substantially 1.8 times the total resistance of potentiometer 21 as measured between end terminals 20 and 22.

With the apparatus thus far described, an output or reference signal of constant amplitude and phase is obtained at either 60 or 400 cycles between the output terminals 23 and 31 of the phase shifter. A signal which is variable in phase but approximately constant in amplitude, is obtained between the output terminals 31 and 32 of the phase shifter and the phase of this signal varies linearly with displacement of the contactor 21' over the resistance element of the potentiometer 21. In the normal application of this circuit, the potentiometer 21 may be of conventional construction having a circular resistance element with the contactor 21' carried by a rotatable shaft and riding on the element. In this way a suitable dial may be employed that is calibrated directly in terms of phase shift.

For the purposes of this description a low frequency compensation network has been arbitrarily selected as the network 11. It comprises three independent series connected sections 35, 36, and 37, each consisting of a condenser and variable resistor connected in parallel. For convenience the condensers are denoted by the letter C followed by a numeral, and the resistors by the letter R followed by a numeral.

The entire network is connected through a condenser C1 to the output terminal 23 of the phase shifter, and is terminated by a resistor R1 connected between the output side of the final network section 37 and the ground terminal 31 of the phase shifter. The output terminal 41 of the network which is formed by the juncture of resistor R1 and the network section 37 may be connected to the measuring devices 12 and 13 through an isolation amplifier 42 of the cathode follower type in order to prevent loading of the network by such devices in cases where large resistance values are used and the highest accuracy is required. In such event, the output terminal 41 of the network is connected to one input terminal of the amplifier 42 and the other input terminal of the amplifier is connected to the ground terminal 31 of the phase shifter. In the case of a low impedance network, the amplifier may be unnecessary.

The output of the amplifier 42 is connected through leads 43 and 44 to the "Y" terminals of the oscilloscope 12 and to the input terminals of the vacuum tube voltmeter 13. The "X" terminals of the oscilloscope 12 are connected through leads 45 and 46 to the terminals 32 and 31, respectively, of the phase shifter.

With this arrangement and with the selected components in the network 11, as the resistors R1 through R4 are varied, the phase shift produced by the network can be measured by adjusting the contactor 21' of the potentiometer 21 to produce a diagonal line on the oscilloscope. This occurs when the voltages fed to the X and Y terminals are exactly in phase. At the same time the amplitude for each setting can be measured by the vacuum tube voltmeter 13. If desired, the oscilloscope and amplifier may be constructed as a single unit with suitable connections for the attachment of a vacuum tube voltmeter or other suitable voltage measuring means.

It is important to note that the resistors R1 to R4 must be varied in a manner directly proportional to frequency in order to obtain the same effect as a change in frequency. Then by utilizing resistance elements R1 to R4 having a logarithmic taper it is possible to adjust the resistance elements individually corresponding to values used in a particular network to be tested and to still have them vary proportional to F when they are all rotated simultaneously. Moreover it is possible to modify all resistance values simultaneously and in this way greatly expedite the examination of the frequency response of the filter being tested.

Figure 2:
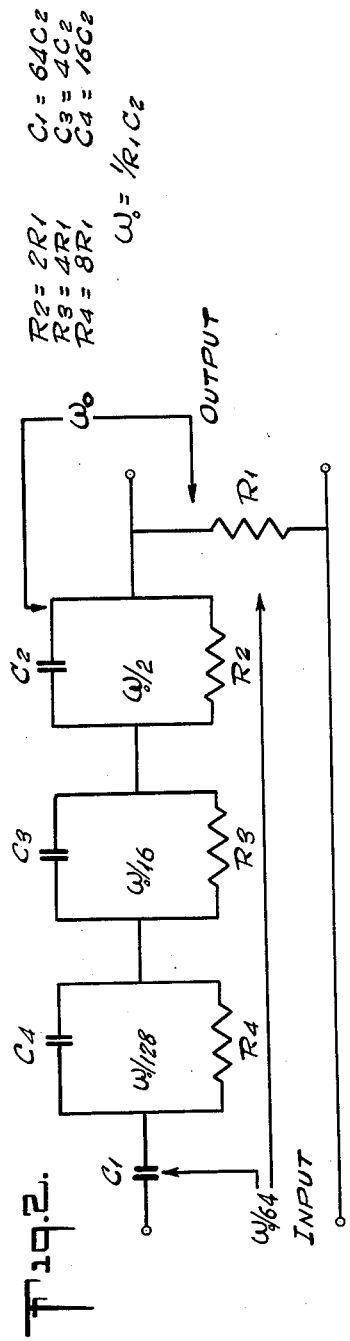
Fig. 2 is an enlarged view of an illustrative filter of Fig. 1 including certain design information.

For illustrative purposes, the network 11 is shown in Fig. 2 along with design formulae wherein all components are computed in terms of $\omega_0$ which is equal to $2\pi$ times frequency. From this computation it will be seen that the phase and amplitude response of the network can be determined either by simultaneously varying either the condensers C1 to C4 or the resistors R1 to R4. Since resistance is more easily and inexpensively handled, it is of course preferable to provide means for altering them in order to determine the network characteristics corresponding to a predetermined frequency change. In cases where many network computations are to be checked, it may be desirable to provide in addition to the phase shifter 10 and variable resistances R1 to R4, suitable decade condenser boxes for securing the desired value of condensers C1 to C4 as may be required.

Figure 3:
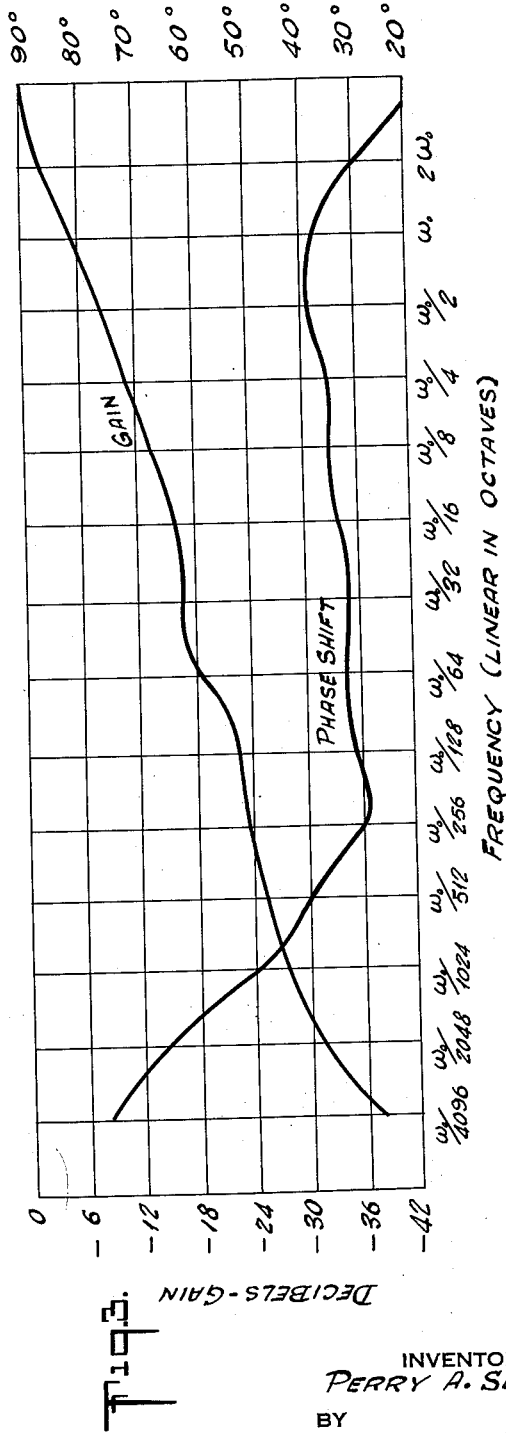
Fig. 3 is a graph showing the relationship of frequency, phase shift and gain of the network or filter of Figs. 1 and 2 measured by the apparatus illustrated in Fig. 1.

Fig. 3 is a graph showing two separate curves, namely, Gain and Phase Shift obtained from an R-C network tested by varying resistors R1 to R4 in accordance with the invention. The Gain curve is plotted in terms of decibels versus $\omega_0$ while the Phase Shift curve is plotted in degrees versus $\omega_0$. In selecting the condensers for a particular application, it is desirable to choose values so that the mid-frequency operation of the analyzer occurs at the power frequency used. Thus, if the analyzer is to be used at 4000 cycles and the resistance values correspond to those at about mid scale on the analyzer, it will be desirable to use about ten times the computed capacity in the analyzer circuit. This will make the midband frequency for the network correspond to the middle of the relative frequency scale on the analyzer and the relative frequency scale can be made to correspond to any frequency.

Figure 4:
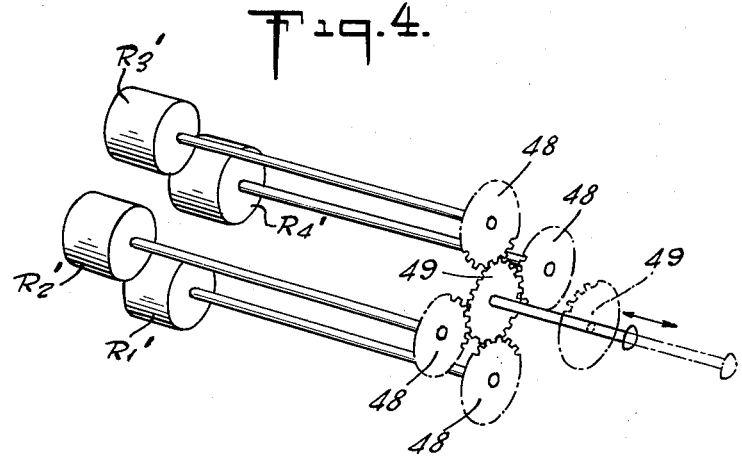
Fig. 4 is a perspective view of one arrangement of the potentiometers forming part of the phase shifting network of Fig. 1.

While the resistors R1 to R4 of network 11 may be arranged in any suitable manner for simultaneous operation, one procedure for the attainment of this end is shown in Fig. 4 of the drawings. In this figure, four rotary type potentiometers or step switches R1' to R4' are provided and may be mounted on a suitable supporting panel. Each potentiometer or step switch carries a gear 48 secured to its shaft and arranged to mesh directly with a central gear 49. In this way rotation of gear 49 will simultaneously rotate all potentiometers. Since the absolute values of the several resistors in each network will normally be different, independent operation of each potentiometer or switch is provided. To attain this end, the gear 49 is preferably mounted for displacement outwardly from the plane of gears 48 to free the potentiometers or switches and permit each one to be moved independently of the others.

It will be observed that through the use of resistors having logarithm tapers, individual adjustment of the resistors for a particular network can be accomplished and at the same time have them vary proportional to frequency when actuated simultaneously. The use of the logarithm taper applies equally to both potentiometers as well as step switches of the type illustrated in the drawings.

Figure 5:
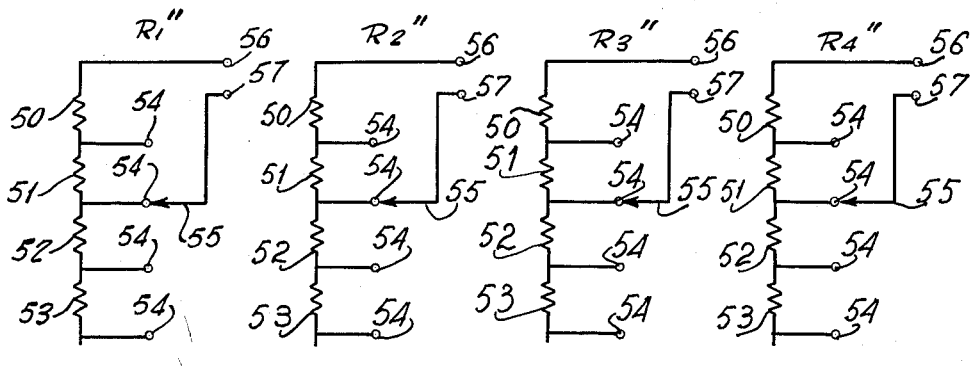
Fig. 5 is a circuit diagram of the several potentiometers of Fig. 4.

As an example of one form of variable resistance that may be used in attaining the objects of this invention, reference is made to Fig. 5 showing diagrammatically step switches R1"–R4" which correspond to R1–R4 respectively. Each step switch has a plurality of contacts 54, a movable contacting arm 55 cooperating with the contacts 54 and a plurality of resistors 50 to 53 connected between the contacts 54. The output terminals 56 and 57 of each switch are connected with one end of resistor 50 and the arm 55 respectively. By coupling each arm 55 to its associated gear 48, all arms can be moved individually or collectively as may be desired. The values of the individual resistors 50, 51, etc. are preferably chosen so that movement of the contactor 55 from one terminal to the next will increase the resistance of the unit 1.41 times or the equivalent of one-half octave in frequency. This figure may of course be modified to obtain smaller or larger frequency steps depending upon the requirements of the specific application. While only four resistors are illustrated in Fig. 5 as being incorporated in each of the switches R1" to R4", it will be understood that any number of resistors may be provided to meet the requirements of a given situation and similarly, any number of switches may be utilized and arranged for simultaneous operation. When the switches such as R1" to R4" are gear driven in accordance with Fig. 4, the gears 48 and 49 should have a number of teeth corresponding to an integral multiple of the number of steps on the switches in the resistances in order to maintain synchronism between the several switches.

Figure 6:
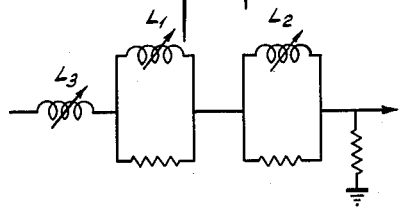
Figs. 6 and 7 illustrate further embodiments of the invention.
Figure 7:
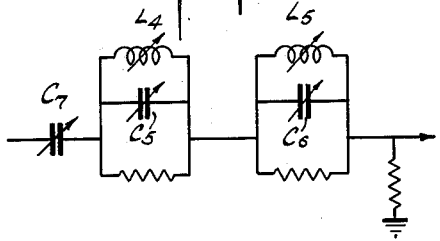

Though it is desirable in most applications to provide for variation of the resistance elements, it is of course possible to obtain similar results by varying C1 to C4. It is clear, however, that the change in frequency will be inversely proportional to the capacity and the indicating scales must of course be arranged accordingly. Another variation of the invention is shown in Fig. 6 wherein the network includes inductances L1, L2 and L3 which when varied simultaneously will produce a change directly proportional to frequency. Fig. 7 is still another modification of the invention utilizing resistance, inductance and capacity. In this case it would be preferable to simultaneously modify both the inductances L4 and L5 as well as the condensers C5, C6 and C7.

From the above it is apparent that the principles of this invention may be applied to the design and testing of all types networks, as for instance band pass and high pass filters. It is also apparent that many modifications or changes may be made without departing from the spirit or scope of the invention.

What is claimed is:

1. Apparatus for determining the characteristics of a phase-shifting network comprising means for developing two separate signals of like frequency and variable phase, means for feeding one of said signals to said network, means for modifying said network to produce an output signal corresponding to that effected by changing the frequency of said one signal and means connected with the other of said signals and said network for indicating the phase difference produced by modification of said network to determine the frequency characteristics of said network.

2. Apparatus for determining the characteristics of a phase-shifting network having a plurality of interconnected resistor and condenser elements comprising means for developing two separate signals of like frequency and variable phase, means for feeding one of said signals to said network, means for modifying at least certain of said elements of said network to produce an output signal corresponding to that produced by changing the frequency of said one signal, and means connected with the other of said signals and said network for indicating the phase differences produced by modification of said elements to determine the frequency characteristics of said network.

3. Apparatus according to claim 2 wherein said modifying means comprises means for changing resistance values of said resistor elements simultaneously.

4. Apparatus according to claim 2 wherein said modifying means comprises means for changing the values of said elements proportionally and simultaneously.

5. The combination with a signal generator producing two signals of equal frequency and variable phase, a resistance-capacitance network connected with one of said signals comprising a plurality of condensers and variable resistors adapted to be interconnected to form a resistance-capacitance network, means for mechanically coupling said resistors for simultaneous variation, means for disengaging said resistors for independent adjustment, and phase indicating means connected with said network and the other of said signals whereby the characteristics of said network to a predetermined frequency range may be determined by proportionally changing each of said resistors by a factor corresponding to a given change in frequency.

6. The method of measuring the characteristics of a phase shifting network having a plurality of interconnected elements to a predetermined change in frequency comprising the steps of applying a single frequency signal of predetermined phase to said network, varying certain of said elements proportionally by a factor corresponding to a predetermined change in frequency and indicating the phase shift produced by varying said elements.

7. The method of measuring the characteristics of a resistance-capacitance network comprising the steps of producing two single frequency signals of variable phase, feeding one of said signals to said network, proportionally varying the resistances in said network an amount corresponding to a predetermined change in frequency and comparing the phase of said one signal as modified by said network to the phase of said other signal.

8. The method of measuring the characteristics of a resistance-capacitance network comprising the steps of producing two single frequency signals of variable phase, applying one of said signals to said network, proportionally varying the resistances in said network an amount corresponding to a predetermined change in frequency, comparing the phase of said one signal as modified by said network with said other signal and varying the relative phase of said signals to determine the phase shift produced by said network.

9. The method according to claim 8 including the step of indicating variations in the amplitude of said one signal as modified by said network.

10. Apparatus for measuring the characteristics of a network having a pair of input terminals, a pair of output terminals and a plurality of resistive and reactive elements coupled between said input and output terminals, comprising means for feeding a single frequency signal of predetermined phase into said network, means coupled to said input and output terminals for indicating the phase of the signal produced by said network relative to the phase of said single frequency signal, and means for varying at least certain of said elements whereby the output signal from said network will vary in phase in the manner corresponding to that produced by maintaining the elements of the network constant and varying the input frequency.

11. Apparatus for determining the characteristics of a network according to claim 10 wherein said reactive elements are in the form of variable inductances.

12. Apparatus for determining the characteristics of a network according to claim 10 wherein said reactive elements include combinations of inductances and capacitances variable by the last said means to determine the response of the network to frequency variations.

13. The apparatus defined by claim 10, further including means coupled to the output terminals of said network for measuring the amplitude of said output signal to determine the amplitude response characteristic of said network as certain of said elements are varied.

14. In apparatus for determining the characteristics of a phase-shifting network, a phase shifter comprising in combination a two-phase generator producing first and second alternating voltages in phase quadrature, a linear potentiometer having first and second end terminals and a movable contact, means coupling said first alternating voltage between the first end terminal of said potentiometer and a common terminal, means coupling said second alternating voltage between the second end terminal of said potentiometer and said common terminal, a first fixed resistor coupled between said movable contact and the first end terminal of said potentiometer, and a second fixed resistor coupled between said movable contact and the second end terminal of said potentiometer, the phase of the output voltage between said movable contact and said common terminal relative to one of said alternating voltages varying linearly according to the position of said movable contact.

15. An electrical phase shifting device comprising a phase shifting potentiometer having a wiper arm in contact with its resistance element, at least two taps on said resistance element spaced apart a selected distance, a plurality of voltage sources connected between ground and said taps having a phase relationship which is a function of the spacing between said taps, a first resistor connected directly between one of said taps and said wiper arm, a second resistor connected directly between the other of said taps and said wiper arm, said wiper arm sensing a phase varying voltage relative to ground as it moves along said resistance element between said taps.

16. Apparatus for varying the phase of an applied alternating current signal comprising in combination, means responsive to said alternating current signal for producing two signals having a predetermined phase difference, a resistive element having a movable contactor and first and second end terminals, means coupling one of said signals between said first end terminal and a common terminal, means coupling the other of said signals between said second end terminal and said common terminal, first resistor means coupled between said movable contactor and said first end terminal, and second resistor means coupled between said movable contactor and said second end terminal, the phase of the output voltage between said movable contactor and said common terminal varying substantially linearly with the displacement of said movable contactor.

17. Apparatus for varying the phase of an applied alternating voltage comprising in combination, a transformer having a primary winding for receiving said applied alternating voltage and a secondary winding, a resistive element having first and second end terminals and a movable contact, a phase-shifting network intercoupling said secondary winding and the first and second end terminals of said resistive element, said phase-shifting network producing a voltage between the first end terminal of said resistive element and a common terminal which is displaced in phase by a predetermined amount from the voltage produced between the second end terminal and said common terminal, first resistor means coupled between the movable contact and the first end terminal of said resistive element, and second resistor means coupled between the movable contact and the second end terminal of said resistive element, the phase of the output voltage appearing between the movable contact of said resistive element and said common terminal being determined by the position of said movable contact relative to said first and second end terminals.

18. Apparatus for determining the characteristics of a phase-shifting network having an input, an output, and a plurality of interconnected elements comprising in combination, means adapted for coupling a fixed frequency alternating voltage to the input of said phase-shifting network, means coupled to said network for modifying certain of the elements of said network to produce an output voltage therefrom corresponding to an output voltage which would have been produced by said network by leaving the network unchanged and varying the frequency of the applied alternating voltage, and means coupled to the input and to the output of said network for measuring the phase shift of the applied fixed frequency alternating voltage introduced by said network.

19. The apparatus defined by claim 18, further including means coupled to the output of said network for measuring the amplitude of said output voltage to determine the amplitude response characteristic of said network as certain of said elements are varied.

References Cited in the file of this patent

UNITED STATES PATENTS

| | | |
|---|---|---|
| 2,285,038 | Loughlin | June 2, 1942 |
| 2,414,477 | Meacham | Jan. 21, 1947 |
| 2,423,463 | Moore | July 8, 1947 |
| 2,448,885 | Hooven | Sept. 7, 1948 |
| 2,483,125 | Cummerow et al. | Sept. 27, 1949 |
| 2,510,087 | De Rosa | June 6, 1950 |
| 2,680,836 | Schuck | June 8, 1954 |
| 2,777,114 | Lowe | Jan. 8, 1957 |